United States Patent [19]

Hunter

[11] Patent Number: 5,724,237
[45] Date of Patent: Mar. 3, 1998

[54] APPARATUS AND METHOD FOR SHARING A LOAD CURRENT AMONG FREQUENCY-CONTROLLED D.C.-TO-D.C. CONVERTERS

[75] Inventor: Patrick L. Hunter, Miami Lakes, Fla.

[73] Assignee: Unipower Corporation, Coral Springs, Fla.

[21] Appl. No.: 661,847

[22] Filed: Jun. 11, 1996

[51] Int. Cl.$^6$ .............................. H02J 1/10; H02M 3/158
[52] U.S. Cl. ............................................. 363/65; 323/272
[58] Field of Search ........................... 363/65, 21, 16, 363/71; 323/271, 272

[56] References Cited

U.S. PATENT DOCUMENTS

| | | | |
|---|---|---|---|
| 4,149,233 | 4/1979 | Nagano | 363/71 |
| 4,415,959 | 11/1983 | Vinciarelli | 363/21 |
| 4,635,178 | 1/1987 | Greenhalgh | 363/65 |
| 4,698,738 | 10/1987 | Miller et al. | 363/65 |
| 4,920,309 | 4/1990 | Szepesi | 323/272 |
| 5,521,809 | 5/1996 | Ashely et al. | 363/71 |

OTHER PUBLICATIONS

VICOR Corporation Publication P/N 10418 Rev. 1 Jan. 1995.
VICOR Applications Manual, pp. 1–1,2–1,2–2,3–1,5–1, 6–1,8–1,9–1,9–2 and 9–3.

*Primary Examiner*—Peter S. Wong
*Assistant Examiner*—Rajnikani B. Patel
*Attorney, Agent, or Firm*—Holland & Knight LLP

[57] ABSTRACT

A current sharing circuit forces current delivered to a common load to be provided in substantially equal shares by two or more D.C.-to-D.C. converters, particularly those of the type whose output varies according to a predetermined functional relationship with the frequency of a controllable signal generated by the converter indicating its operating frequency. The load current delivered by such converters typically varies approximately proportionately with the converter operating frequency when the converter input and output voltages are held constant. Based on the frequency of these indicating signals and the predetermined relationship between their frequency and the output current of each respective converter, it is determined which particular one of the converters is presently supplying the largest share of load current. The outputs of each of the other converters are adjusted to share the load more equally among all the converters. In the preferred embodiment a frequency to voltage converter senses the operating frequency and converts it to a filtered analog voltage which is functionally related to the input frequency. An amplifier circuit compares this analog signal with the same signal from other D.C.-to-D.C. converters. The error signal is used as a control signal to adjust the converter output voltage to force the analog signal to be substantially equal to the analog signals from other D.C.-to-D.C. converters, which in turn, forces the operating frequencies and currents delivered to the common load by each converter in the system to be substantially equal.

3 Claims, 4 Drawing Sheets

APPARATUS AND METHOD FOR SHARING A LOAD CURRENT AMONG FREQUENCY-CONTROLLED D.C.-TO-D.C. CONVERTERS

FIELD OF THE INVENTION

The invention relates to sharing an electrical load among two or more D.C.-to-D.C. converters. More particularly, the present invention relates to an apparatus and method for sharing an electrical load among two or more D.C.-to-D.C. converters, especially the type whose output varies according to a controllable operating frequency.

BACKGROUND OF THE INVENTION

D.C.-to-D.C. converters are commonly paralleled at their outputs either to provide higher output power to a load or to provide redundant operation in high reliability applications where the output must be maintained within specification in the event of a failure of a D.C.-to-D.C. converter. D.C.-to-D.C. converters are often used in switching power supplies having A.C. inputs where the A.C. is converted to a filtered D.C. voltage which provides the input for D.C.-to-D.C. converters. In a switching power supply, D.C.-to-D.C. converters commonly provide galvanic isolation between source and load. They also provide regulation, final filtering, and the protection required by each output. Converters paralleled at their outputs will provide some degree of current-sharing without being forced, provided the slope in their individual regulation characteristic is sufficiently large. However, at low D.C. voltages (e.g. 12 volts or lower) high regulation cannot generally be tolerated. If resistance is added in series with a highly regulated output the result is the same. Various types of circuits for sharing a common load among a plurality of D.C.-to-D.C. converters are known. One type senses the converter output current using a resistor connected in series with its output, compares this to other converters and provides corrective signals to force load sharing. This is problematic when working with low voltage and high currents due to the power loss caused by the sensing resistor and difficulty in implementation. Current transformers are frequently used when A.C. currents are available for sensing. This solves the power loss problem inherent with resistor sensing in the output circuit, however it is not always possible to have access to circuits where A.C. current can be sensed with a current transformer and other solutions are needed.

In recent years new circuit topologies and packaging technologies have resulted in the availability of modular D.C.-to-D.C. converters which operate at very high frequencies; up to 2 MHZ. These are typically packaged in low profile fully enclosed or encapsulated modules provided with solder pins or screw termination for input, output, and control interfaces. Exemplary of these are the VICOR Corporation VI-200 or VI-J00 families of modular D.C.-to-D.C. converters. These converters utilize a single-ended, forward type converter which switches at zero current. This basic topology is described in U.S. Pat. No. 4,415,959.

Such a converter typically includes a transformer having a finite leakage inductance. The primary winding of the transformer is connected to a D.C. voltage source through a semiconductor switch whose conductive state is governed by a control circuit. The secondary winding of the transformer is connected across a capacitor though a diode whose polarity is oriented to allow the diode to conduct current unidirectionally, toward a load during conduction of the switch. The load is connected across the capacitor by way of a series inductance. A second diode is paralleled with the capacitor to ensure the potential across the capacitor remains unipolar.

In operation of such a converter, the control circuit within the converter utilizing either voltage feedback from the load or an external signal applied to a GATE-IN terminal, selectively opens and closes the switch under zero current conditions to gate the flow of electrical energy unidirectionally from the source to the load by way of intermediate stages of magnetic and electrical energy storage. Magnetic energy storage is effected by the leakage inductance of the transformer which serves as the inductance in an L-C circuit which includes the aforementioned capacitor to effect electrical energy storage. The values of the leakage inductance of the transformer and the capacitance of the capacitor determine the half-period of the resulting non-resonant energy transfer cycle. The voltage across the capacitor is bounded and, due to the action of the diodes, the current form remains both unidirectional from source to load and unipolar. The peak value of the capacitor voltage determines the amount of energy delivered to the load in a single energy transfer cycle. Through frequency control, the control circuit controls the time interval between successive conduction cycles of the switch and thus, the power delivered to the load. Due to the unidirectional (i.e., non-resonant) flow of energy and by switching only under zero current conditions, very high efficiency can be obtained using such a converter. When combined with a voltage feedback regulating circuit, a forward type, zero current switching D.C.-to-D.C. converter as just described will provide very precisely regulated output voltage for wide input voltage and load current variations. The time interval, between successive energy transfer cycles, the inverse of frequency, is controlled to maintain a constant output voltage. Where the input voltage is constant, the switching frequency varies approximately in a direct relationship to the load current and where the load current is constant the frequency is approximately inversely proportional to the square of the input voltage.

D.C.-to-D.C. converter modules of the type just described are provided with galvanically isolated D.C. input and output terminations (+Vi, −Vi and +$V_o$, −$V_o$, respectively) as well as output remote sense terminals (+S and −S) for voltage regulation sensing, a "TRIM" input allowing for external adjustment of the output voltage, a "GATE-IN" terminal allowing the module to be synchronized to another module, and a "GATE-OUT" terminal provided for slaving other modules to a given converter module. The "GATE-IN" and "GATE-OUT" signals are typically referenced to the negative input terminal, −Vi, and the remote sense (+S, −S) and "TRIM" terminals are typically referenced to the output terminals. There are no output signals available for monitoring or sensing load current within the module and no provisions are made for current sharing between converter modules referenced on the secondary or output side. Two or more converter modules of this type can be paralleled at their outputs for higher power by utilizing "Booster" or "Modified Driver" modules connected in a daisy chain so as to synchronize their "GATE-IN" signals with the operating frequency signal provided at the "GATE-OUT" terminal of a master module. This technique is described in VICOR Applications Manual, Third Edition. However, there are significant limitations to this scheme of paralleling. First, it is a master-slave paralleling technique. As such, it cannot be used to provide redundancy because a failure of one module will render any modules slaved to it incapable of supplying a load. Secondly, the control inputs and outputs are referenced to the input side of the converter. This makes it impractical to parallel between separate power supply units since control signals which communicate between power supplies must be protected as required by various international safety agencies such as UL, CSA and IEC. An additional limitation is that this technique cannot be used to parallel modules from different D.C. sources which must be galvanically isolated from one another. These limitations are recognized by those who have applied these modules to parallel power supplies in applications where increased power or redundancy is required.

SUMMARY OF THE INVENTION

This invention provides a novel apparatus and method for load current sharing between D.C.-to-D.C. converters. The invention is well-suited to certain types of D.C.-to-D.C. power topologies, particularly those whose output varies according to a controllable operating frequency. One example of such a D.C.-to-D.C. converter are the single-ended, forward type described above which process power in a sequence of energy transfer cycles whereby a quantum of energy is transferred unidirectionally from the source to the load by switching at zero-current under variable frequency control. The invention permits two or more such D.C.-to-D.C. converters to be paralleled so that each of them supplies a substantially equal share of current to a load without entailing the above-described limitations of the prior art.

In accordance with the invention, a system including two or more D.C.-to-D.C. converters whose outputs are connected mutually in parallel to a common load are each made to supply substantially equal shares of the load current by forcing each of their "TRIM" inputs to respond to a control signal representing any difference between the present output of that converter and the highest current then being supplied to the load by any other D.C.-to-D.C. converter in the system. According to a method of the invention, this is achieved in part by making novel use of an indicating or GATE-OUT signal which is generated by each converter and which provides information as to its operating frequency and thus, its output. The GATE-OUT indicating signals from each converter are used to determine which one of the converters is presently supplying the largest share of the load current. The TRIM inputs of each of the other converters are then excited with respective control signals whose respective magnitudes vary according to the difference between the present output of that converter and the output of the converter supplying the largest share of the load current.

In a preferred embodiment of the apparatus aspect of the invention, the outputs of two or more zero current switching D.C.-to-D.C. converters are connected mutually in parallel with one another and to a common load. After any necessary waveshaping, the GATE-OUT signal generated by each converter is applied to the input of a frequency-to-voltage converter (f/v), one of which is associated with each D.C.-to-D.C. converter in the system. At any given time, each f/v generates an analog voltage whose magnitude is proportional to the operating frequency and hence, the output of its associated D.C.-to-D.C. converter. After passing each of these signals through a respective bus driver, they are each tied to a common bus. The voltage on the bus at any given time represents the magnitude of the output current being supplied by the particular one of the D.C.-to-D.C. converters which is supplying the highest output current at that time. A differential amplifier is also associated with each respective D.C.-to-D.C. converter and has its output coupled to the "TRIM" input of its respective converter. Each differential amplifier has two inputs, one of which is coupled to the bus. The other input of each differential amplifier is coupled to the output of that f/v whose input receives the GATE-OUT signal of the D.C.-to-D.C. converter whose "TRIM" input is coupled to the output of that differential amplifier.

In operation, the particular D.C.-to-D.C. converter delivering the highest current to the load at any given time will have the highest operating frequency at its GATE-OUT terminal and thus, the highest output voltage from its respective bus driver. This particular converter becomes the dominant driver relative to the others and determines the bus voltage which thus represents the maximum magnitude of the current being delivered by any one of the D.C.-to-D.C. converters in the system at a given moment. Each differential amplifier in the system compares the bus voltage to the voltage at the output of its own associated frequency-to-voltage converter. If the bus voltage is higher than the voltage presently being generated by the f/v, the differential amplifier coupled to that f/v applies a control signal proportional to the voltage difference to the "TRIM" input of the D.C.-to-D.C. converter thereby raising its output voltage. As the output voltage increases, the output current and the operating frequency of the D.C.-to-D.C. converter both increase and through feedback, the voltage generated by the f/v is forced to be approximately equal to the bus voltage thus equalizing the current being supplied by the D.C.-to-D.C. converter to that being supplied at the same time by the dominant converter. Conversely, if the voltage generated by a given f/v converter exceeds the bus voltage at some time, that converter then becomes dominant converter for the bus and causes all other D.C.-to-D.C. converters in the system to raise their output currents in the manner just described so that those currents each become approximately equal to the current being supplied by the dominant converter. When its associated converter is the dominant converter driving the bus, the differential amplifier associated with that converter has no output error signal and therefore has no effect on the output voltage of the dominant converter. The invention regulates the load voltage to the highest individual voltage set point of any of the D.C.-to-D.C. converters in the system.

This new apparatus and method provides an improved means for current sharing between frequency-controlled D.C.-to-D.C. converters. The invention forces the load current to be supplied in substantially equal shares by each of the converters in the system without the need to introduce a sensing resistor in the output circuit which would cause power dissipation and entail additional cost.

The invention can be readily implemented as a control option in any application where current-sharing among two or more converters is required or is desirable such as where additional current may be required to handle an increased load. Since frequency is preferably used as a control variable, the GATE-OUT signal indicating converter output current can readily be isolated through small pulse transformers or other galvanic isolation devices to permit safe interconnection of control signals between power converters. Thus, while the GATE-OUT signal is described in the preferred embodiment as being referenced to the input side of the converter, the invention provides the flexibility to permit it to be referenced to the output side. The invention also allows a plurality of converters to be paralleled in order to provide an N+1 redundant system. In such as system, a single converter failure will not effect the remaining converters as would be the case if a master-slave current sharing scheme were employed. Converter outputs can also be paralleled directly or paralleled through isolation or "ORing" diodes as commonly used in high reliability applications. The invention is not limited to applications at specific input or output voltages or at specific output currents or power levels. It can also readily be adapted for use as a current monitor to provide an analog signal indicative of load current. The output error signal from each differential amplifier is limited to a maximum value to minimize the maximum output voltage deviation required to share current. This limits the output voltage deviation of the converter during transient conditions such as when another converter happens to fail in a redundant system.

These and other aspects and advantages of the invention will become more apparent to the person of ordinary skill in the art upon review of the following detailed description taken in conjunction with the appended drawings in which like reference numerals designate like items.

DETAILED DESCRIPTION OF THE INVENTION

Figure 1:
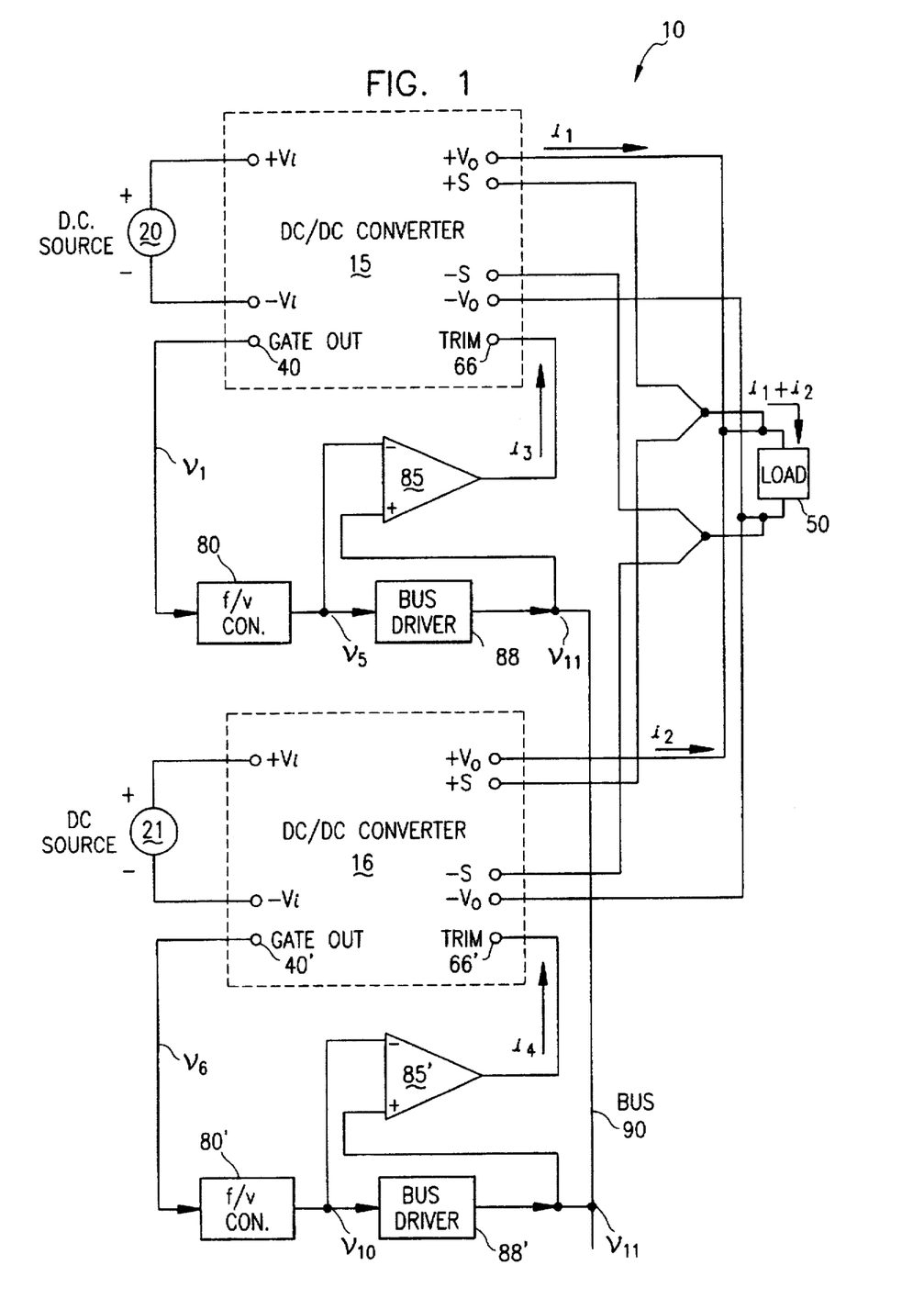
FIG. 1 shows a preferred embodiment of a current share circuit used with forward type converters switching at zero current constructed according to the principles of the present invention.

FIG. 1 shows a preferred embodiment of a current share circuit 10 constructed according to the invention. Circuit 10 of the preferred embodiment is implemented using single-ended, forward type, zero current switching D.C.-to-D.C. converters 15, 16 which are preferably of the type shown in FIG. 2. Each converter 15, 16 may be coupled to a respective D.C. source 20, 21 by way of positive and negative input terminals labeled $+V_i$ and $-V_i$, respectively. Sources 20, 21 may either be a common source or separate sources. Converters 15, 16 are described in detail in U.S. Pat. No. 4,415,959 which is expressly incorporated herein by reference in its entirety. A brief overview of the structure and operation of converters 15, 16 will facilitate an understanding of the present invention and will be provided below with reference to FIG. 2.

Figure 2:
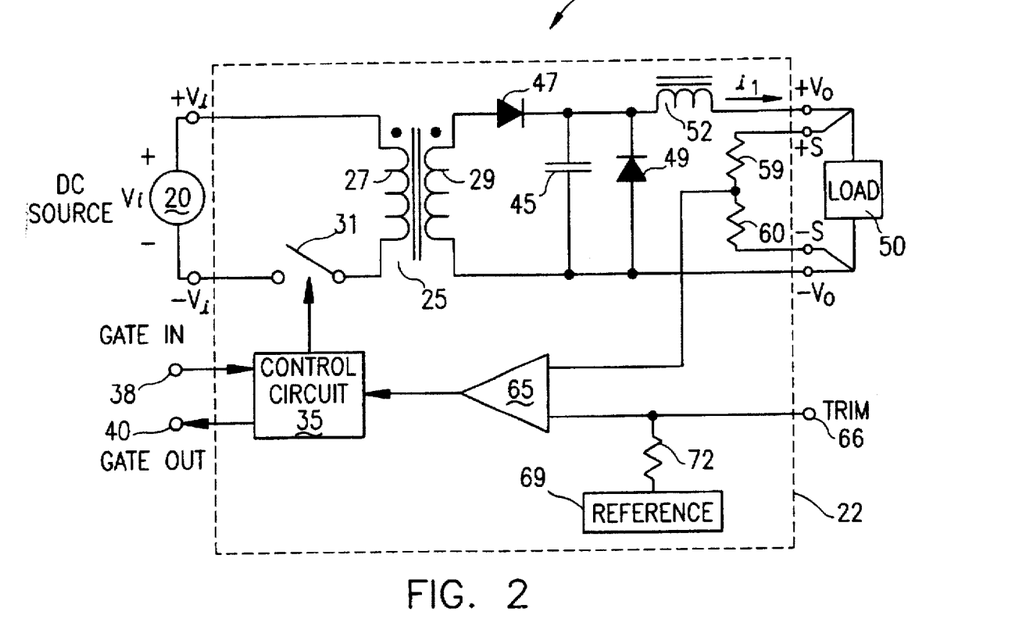
FIG. 2 is a schematic diagram of a typical forward type, zero current switching converter of the general type shown in FIG. 1.

As FIG. 2 illustrates, converters 15 and 16 are each typically mounted within a modular housing 22 and include a transformer 25 having a primary winding 27 and a secondary winding 29. Primary winding 27 is connected in series with a MOSFET type switch 31 which opens and closes at a controllable operating frequency under the control of a control circuit 35 to intermittently couple primary winding 27 to D.C. source 20 or 21 for successive time intervals whose duration is determined by the power circuits parametric values and control circuit 35. This operating frequency is governed either by a signal applied to a GATE-IN input terminal 38 or under internal feedback control as will be described. The operating frequency of converter 15 or 16 may be sensed in accordance with the frequency of an indicating signal generated internally by converters 15, 16 and appearing as a pulse train at a GATE-OUT terminal 40. Secondary winding 29 is connected across a capacitor 45 by way of a diode 47 whose polarity is oriented as shown to block any current from flowing in reverse from capacitor 45 through secondary winding 29. A second diode 49 is connected in parallel with capacitor 45 to ensure that the voltage across capacitor 45 remains unipolar. A pair of D.C. output terminals $+V_o$ and $-V_o$ are provided to facilitate connection of an external load 50 across capacitor 45 by way of a series inductor 52. To facilitate internal load voltage sensing, converters 15 and 16 are each equipped with external sensing terminals, +S and −S, which are connected to one another inside of housing 22 by way of a pair of resistors 59, 60 forming a voltage divider. The voltage developed between resistors 59 and 60 is applied to the one input of a differential amplifier 65 whose other input is connected to a TRIM input terminal 66, as well as to a voltage reference 69 which is connected in parallel to TRIM input terminal 66 by way of a resistor 72 as shown. The output of differential amplifier 65 is applied to control circuit 35 in order to apply feedback for controlling the operating frequency of switch 31. Converters 15 and 16 may each suitably comprise single ended, forward type, zero current switching converters such as those of the VI-200 series or the VI-J00 series, both of which are available from VICOR Corporation of Andover, Mass., or their equivalent.

Figure 3:
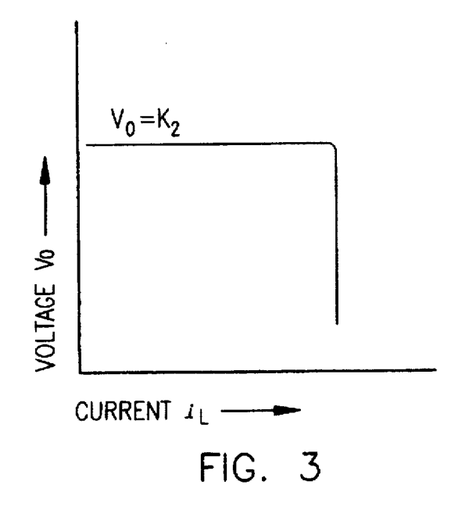
FIG. 3 is a graph illustrating a typical regulating characteristic for the converter of the type shown in FIG. 2.

Converters 15 and 16 are each capable of providing a constant output voltage over their output load range by comparing the output voltage appearing across terminals $+V_o$ and $-V_o$ to an internal reference voltage and adjusting the frequency of the converter accordingly. To achieve such operation, the voltage divider formed by resistors 59 and 60 senses the voltage across a load 50 by way of remote sensing terminals +S and −S. Amplifier 65 compares this voltage to the voltage of a reference source 69 through resistor 72. If the output voltage across load 50 is low, the input terminal of amplifier 65 connected to the common junction of resistors 59 and 60 will be low relative to its other input terminal. In that case, the output of amplifier 65 will provide an amplified error signal to control circuit 35, thus increasing the operating frequency of converters 15 or 16. Control circuit 35 will automatically make adjustments in the operating frequency of switch 31 to maintain the output voltage constant notwithstanding variations which may occur in output load current $i_L$ and/or the D.C. source voltage $V_i$. A typical output characteristic for converters 15 and 16 circuit is illustrated in FIG. 3. The output voltage Vo can be held within very narrow regulating limits by providing sufficient gain in amplifier 65. As shown in FIG. 3, the output of converters 15 and 16 can be current-limited for overload protection by adding optional internal current-limiting circuits (not shown). Such current-limiting circuits are well known to those skilled in the design and use of D.C.-to-D.C. converters.

Figure 4:
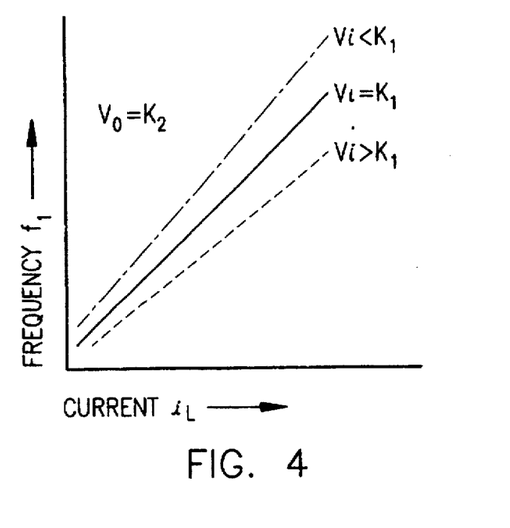
FIG. 4 is a graph illustrating a typical operating frequency vs. load current characteristic for a converter of the type shown in FIG. 2.

FIG. 4 illustrates the manner in which the operating frequency, $f_1$, of converters 15 and 16 varies according to a predetermined relationship with load current $i_L$ where the output voltage, Vo, is held constant for different constant values for input voltage Vi. If the output voltage, Vo, is regulated at a constant value $K_2$ and the input voltage $V_i$ is held constant at a value $K_1$, the operating frequency $f_1$ varies in approximately proportional relationship to the load current. The slope of the curve is not exactly constant over the load range due to effects of variations in losses and nonlinear characteristics of components. It has been established that D.C.-to-D.C. converters of this type have consistent curves of frequency $f_1$ vs. load current $i_1$ when component tolerances in the power circuit are well controlled. When supplied with the same input voltage $V_i$ and paralleled at the output terminals D.C.-to-D.C. converters of the type under consideration share current within about 5% if their frequencies are synchronized using slave booster converters. Booster versions of the D.C.-to-D.C. converter can be derived by deleting or defeating the functionality of the secondary control amplifier 65 of FIG. 2. A booster converter (i.e., a slave) can be synchronized to a master converter module by coupling the SYNCH output (GATE-OUT) of the master module to the SYNCH input (GATE-IN) to the slave module. A plurality of slaves can be daisy-chained in this manner according to the prior art subject to the limitations discussed above.

With renewed reference now to FIG. 1, D.C.-to-D.C. converters 15 and 16 configured according to the present invention, are connected mutually in parallel at their output terminals +Vo and -Vo across a common load 50. The input terminals +$V_i$ and -$V_i$ of converters 15 and 16 are connected across respective D.C. sources 20 and 21, which, as noted above, may comprise a common source or separate sources. It is important, however, with respect to the performance of circuit 10 that the magnitudes of the voltage of sources 20 and 21 be substantially equal as differences in those magnitudes will produce errors in the balance of current-sharing among converters connected according to the invention. The GATE-OUT terminal 40 of converter 15 is coupled to the input of a frequency-to-voltage converter (f/v) 80 whose output is coupled both to the inverting input of a differential amplifier 85 and to the input side of a bus driver 88 which will be described in further detail below. The output of bus driver 88 is coupled to a common connection point or bus 90 which in turn is coupled to the non-inverting input of differential amplifier 85. Differential amplifier 85 generates a control signal $i_3$ which is applied to the TRIM input terminal 66 of converter 15. Converter 16 is similarly configured with its output terminals +$V_o$ and -$V_o$ being connected across load 50. The sensing input terminals +S and -S of each converter, 15 and 16, are connected as shown. In a completely analogous manner to the configuration of converter 15, converter 16 has its GATE-OUT terminal 40' coupled to the input of a second frequency-to-voltage converter (f/v) 80'. The output of f/v 80' is coupled both to the input of a second bus driver 88' and to the inverting input of a second differential amplifier 85' whose output $i_4$ is coupled to the TRIM input terminal 66' of converter 16. The output of the second bus driver 88' is also coupled, by a direct connection in the preferred embodiment, to bus 90.

It is important to note that the invention is not limited to paralleling just two converters 15 and 16. Additional converters and associated components of the same topology described above can be connected in parallel if desired so as to divide the current supplied to load 50 among more than two D.C.-to-D.C. converters. For simplicity of discussion however, the drawings and the remainder of this description are limited to the case where only two converters 15 and 16, are paralleled. From this description, it will be apparent to those skilled in the art how additional converters can be added in a similar manner.

It is assumed in this description that D.C.-to-D.C. converters 15 and 16 are of the same topology as described in FIG. 2 and therefore have essentially the same functional relationship or transfer function, G, relating converter operating frequency $f_1$ or $f_2$ to output current $i_1$ or $i_2$. A control signal $v_1$, $v_6$ which is a periodic function of time, is derived from each respective converter 15, 16:

$$v_1 = G_1(2\pi f_1 t) \qquad \text{Eq. (1)}$$

and $$v_6 = G_2(2\pi f_2 t), \qquad \text{Eq. (2)}$$

where $f_1$ and $f_2$ are the fundamental operating frequencies of converters 15 and 16 represented by the indicating signals appearing at GATE-OUT terminals 40 and 40', respectively, and where $G_1$, and $G_2$ are time functions of these operating frequencies.

Figure 5:
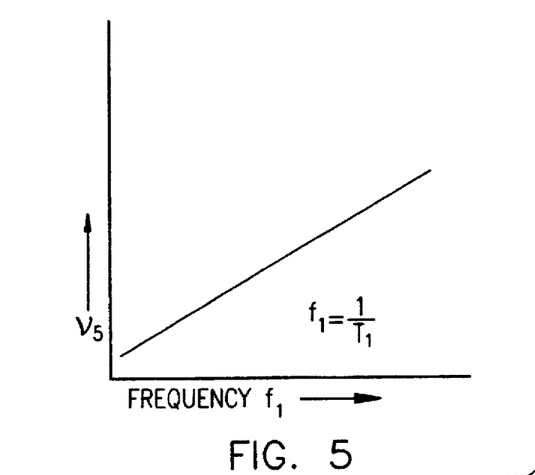
FIG. 5 is a graph illustrating the output voltage vs. operating frequency characteristic of a frequency to voltage converter of the general type shown in FIG. 1.

Control signals $v_1$ and $v_6$ are processed by separate frequency to voltage converter circuits 80 and 80', which generate respective D.C. output voltages $v_5$ and $v_{10}$ which are linearly related to frequency as shown in FIG. 5. The outputs become functions of the type:

$$v_5 = V_5 + K_5 f_1 \qquad \text{Eq. (3)}$$

$$v_{10} = V_{10} + K_{10} f_2 \qquad \text{Eq. (4)}$$

where $K_5$ and $K_{10}$ are constants.

As illustrated in FIG. 4, operating frequency is a substantially linear function of converter output current and may be represented by the equations:

$$f_1 = G_{11}(i_1) \qquad \text{Eq. (5)}$$

and $$f_2 = G_{22}(i_2) \qquad \text{Eq. (6)}$$

Substituting equations 5 and 6 into equations 3 and 4, yields:

$$v_5 = V_5 + K_5 G_{11}(i_1) \qquad \text{Eq. (7)}$$

$$v_{10} = V_{10} + K_{10} G_{22}(i_2) \qquad \text{Eq. (8)}$$

Provided functions $G_{11}(i_1)$ and $G_{22}(i_2)$ are substantially linear, $v_5$ and $v_{10}$ will likewise be substantially linear functions of converter output current. It is not necessary, however, that $v_5$ and $v_{10}$ be linear with respect to $i_1$ and $i_2$ provided they have substantially the same functional relationship (i.e., track each other closely), and are smooth, without discontinuities or changes in slope, over the desired range of operation.

Voltages $v_5$ and $v_{10}$ are compared separately by amplifiers 85 and 85', respectively, with the voltage $v_{11}$ on bus 90 in order to generate the control signals $i_3$ and $i_4$ which force the magnitudes of the output currents $i_1$ and $i_2$ supplied by converters 15 and 16, respectively to be substantially equal to one another. Voltage $v_5$ is compared by amplifier 85 to the voltage $v_{11}$ which appears on common bus 90. As noted above, bus 90 is common to all converters 15, 16 included in circuit 10. If $v_5$ is equal to or more positive than $v_{11}$, the control signal $i_3$ generated by differential amplifier 85 is zero and has no effect on the output voltage or output current $i_1$ of converter 15. Bus driver 88 provides a low impedance source to drive bus 90 so that the voltage $v_{11}$ on bus 90 will track $v_5$ as long as $v_{10}$ is negative with respect to $v_{11}$. Thus, $v_5$ is effectively compared to $v_{10}$ through the respective bus drivers 88 and 88'. The bus driver 88 or 88' with the highest voltage becomes the dominant driver of the bus 90. If $v_{10}$ becomes negative with respect to $v_5$ and $v_{11}$, bus driver 88' cannot source current to bus 90 and amplifier 85' has a positive error signal applied across its input terminals. In that event, amplifier 85' provides a control signal $i_4$ to the TRIM input terminal 66' of D.C.-to-D.C. converter 16. A positive current $i_4$ causes the TRIM input terminal voltage of the converter 16 to rise and causes the operating frequency $f_2$ of converter 16 to increase. This in turn increases the output current $i_2$ supplied to load 50 by converter 16. When $f_2$ increases, the voltage $v_{10}$ increases to reduce the error signal voltage $v_{11}-v_{10}$. Given sufficient gain in amplifier 85', the voltage $v_{10}$ is forced to be approximately equal to $v_{11}$. Because the error signals across the bus drivers 88 and 88' are minimized in this fashion, $v_{10}$ is forced to track and be approximately equal to $v_5$ and vice versa. By requiring $v_5$ to equal $v_{10}$, circuit 10 forces the output currents $i_1$, and $i_2$ supplied to load 50 to be substantially equal to one another provided the functions and constants in equations 7 and 8 are substantially equal. The D.C.-to-D.C. converter 15 or 16 having the highest output voltage setting determines the voltage across load 50. The feedback gain of the internal amplifier 65 shown in FIG. 2 for voltage regulation is typically very high. Accordingly, only small error currents need be applied to the TRIM inputs 66, 66' through internal resistor 72 to force substantial changes in the output currents $i_1$ and $i_2$ delivered to load 50 by converters 15 and 16, respectively.

From the foregoing description, those skilled in the art will recognize that additional D.C.-to-D.C. converter units can be paralleled across load 50 in the manner just described to provide additional power capacity and/or redundancy with bus 90 being connected to the bus driver associated with each such additional converter as well as to the non-inverting input of the differential amplifier driving the TRIM input terminal of each additional converter. Remote sense leads (+S and −S) are preferably used to compensate for distribution voltage drops across the cables connected to load 50 thereby improving load regulation.

Circuit 10 will continue to force current-sharing as voltages of the D.C. sources 20 and 21 vary provided these voltages are of substantially the same magnitude. Even though the transfer function illustrated by FIG. 4 changes somewhat with input voltage, differences between the transfer functions of each converter 15, 16 will typically be small so as to provide excellent performance in most applications.

It can be appreciated from the foregoing that the invention provides a flexible and effective apparatus and method for paralleling two or more D.C.-to-D.C. converters either for providing redundancy to maintain the output within specifications when a single converter has failed or to increase available load current. In redundant systems an "OR-ing" rectifier (not shown) can be connected in series with the output circuit of each paralleled D.C.-to-D.C. converter between its $+V_o$ terminal and load 50. Such a rectifier will serve to block reverse current flow from the common load 50 back into the output terminal of any converter 15 or 16 which may fail so as to prevent undesired voltage disturbance on the load circuit in the event a converter develops a short circuit in its output circuit. Such an "OR-ing" diode (not shown) is optional and may be used or not depending on the level of reliability desired by the user. Circuit 10 will perform properly in either case.

To better understand how the invention operates to provide redundancy, assume that converters 15 and 16 are initially sharing load equally such that $i_1=i_2$. Further assume that converter 16 subsequently fails, causing $i_2$ to drop to zero. This will cause $v_{10}$ to go to a low value compared to $v_5$. Differential amplifier 85' will be incapable of raising the output voltage or the output current $i_2$ due to the failure of converter 16. Bus driver 88 will then become the dominant driver of bus 90 and the output current $i_3$ of amplifier 85 is zero and thus, has no effect on the output voltage setting of D.C.-to-D.C. converter 15. Converter 15 will supply the entire load current delivered to load 50 and continue to regulate the load 50 according to its own voltage setting. As noted above, more than two converters can be paralleled so that in the event one converter fails the remaining converters will continue to share the load equally among them and the voltage across load 50 will be regulated to the highest set point voltage of the remaining converters.

Figure 6:
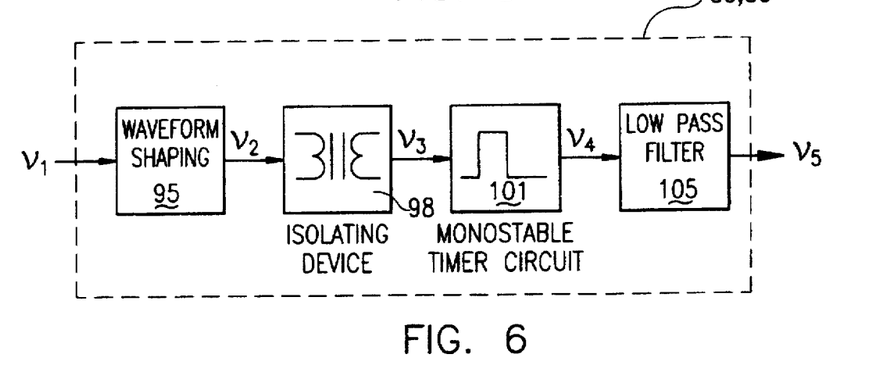
FIG. 6 is a block diagram illustrating a preferred frequency to voltage converter of the type shown in FIG. 1.

The frequency-to-voltage converters 80 and 80' shown in FIG. 1 can be implemented in any suitable manner, including but not limited to using phase-locked loops. A preferred construction is illustrated in the block diagram of FIG. 6 which will now be explained. A waveform shaping circuit 95 and an isolation device 98 provide a synchronization pulse $v_3$ to a monostable timer circuit 101. Timer circuit 101 in turn generates a single output voltage pulse $v_4$ once per cycle of the input voltage $v_1$ appearing at GATE-OUT terminal 40. Pulse $v_4$ has a constant amplitude and pulse width and is passed through a low pass filter circuit 105 to attenuate any high frequency harmonics in order to provide a smooth D.C. voltage $v_5$ whose magnitude is proportional to the average value of $v_4$.

Figure 7A:
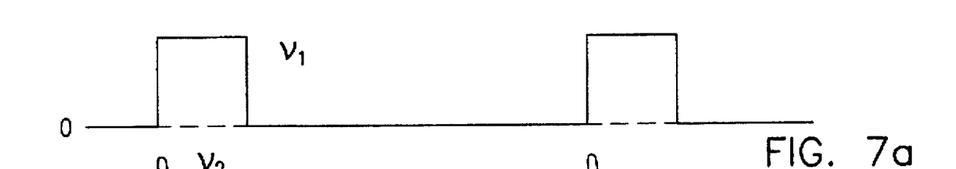
FIG. 7a, FIG. 7b and FIG. 7c together form a timing diagram showing waveforms useful in describing the operation of the frequency to voltage converter of FIG. 6.
Figure 7B:
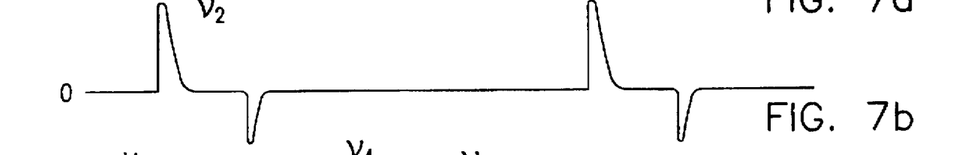
Figure 7C:
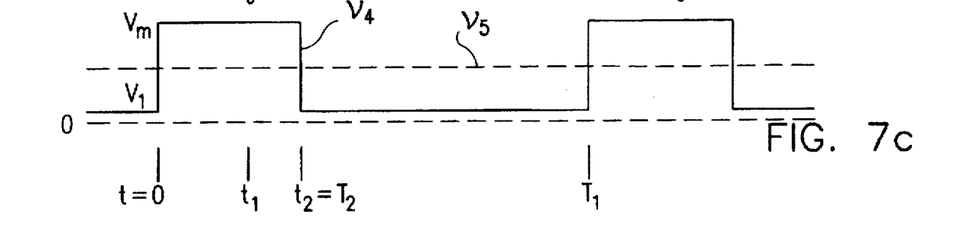

Typical waveforms for $v_1$, $v_2$, $v_4$, $v_5$ are shown in FIGS. 7a, 7b and 7c. In FIG. 7a, $v_1$ is an output signal derived from the D.C.-to-D.C. converter GATE-OUT terminal 40 of converter 15. Since this output signal is usually referenced to the input side of converter 15, means must be provided to isolate and shape the waveform to generate a secondary or output side referenced waveform suitable to trigger monostable timer circuit 101 which itself is connected to the secondary circuit. In the preferred embodiment, an isolation transformer is selected for use as an isolating circuit 98, however, other means such as optical isolators can be used if desired, provided their high frequency characteristics are sufficient for the application. To reduce the required bulk and weight of the isolation transformer, the signal $v_1$ is initially passed through a waveform shaping circuit 95 to derive a pulse waveform $v_2$ of the type shown in FIG. 7b. Use of a short time duration pulse permits isolation circuit 98 to be implemented using an isolation transformer having a small core and a relatively small number of turns. In the preferred embodiment, monostable timer 101 is synchronized with the positive-going pulse of waveform $v_3$, however, it may equally well be synchronized with its negative pulse if desired since only information concerning frequency ($f_1=1/T_1$) and not phase information need be maintained in order to provide proper operation. As FIG. 7c illustrates, the waveform voltage $v_4$ takes the form of a pulse of constant amplitude, $V_m$, which persists for a fixed time duration $t_2=T_2$. Once waveform of $v_4$ is filtered by low pass filter 105 there is generated a D.C. output voltage, $v_5$, which can be expressed as:

$$v_5 = K\left[ V_1 + (V_m - V_1)\frac{T_2}{T_1} \right] = KV_1 + K(V_m - V_1)T_2 f_1 \qquad \text{Eq. (9)}$$

where: $T_2$ is a time interval which is less than $T_1$ and where $K$ is constant, $V_m$ is the maximum voltage of waveform $v_4$ and $V_1$ is its minimum voltage. $T_2$ is selected based on the maximum converter operating frequency, $f_1$, for all normal operating conditions of input voltage and load current.

Figure 8:
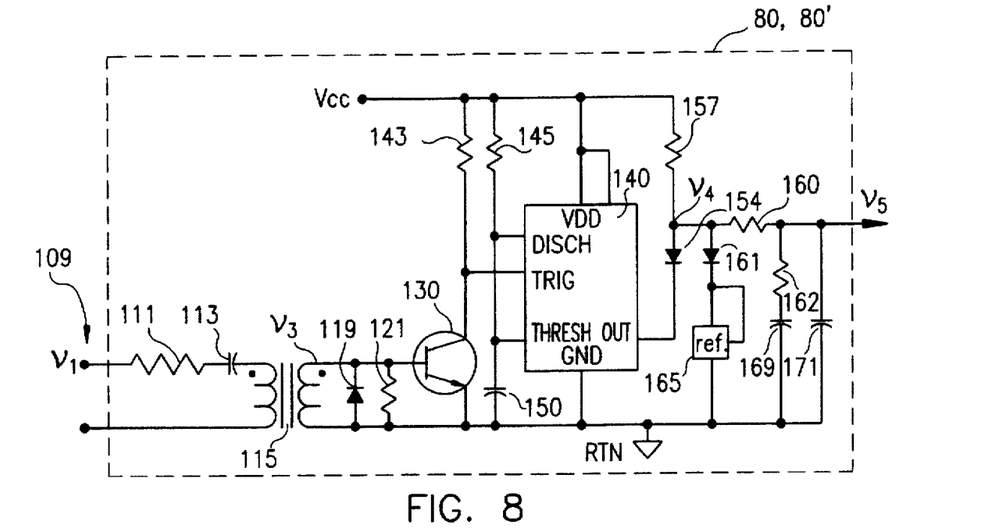
FIG. 8 is a schematic diagram illustrating a preferred embodiment of the frequency to voltage converter of FIG. 6.

FIG. 8 illustrates in further detail a preferred embodiment of the frequency-to-voltage converter 80, 80' shown in FIG.

6 and whose structure and operation will now be described. The waveform $v_1$ shown in FIG. 7a is applied to an input 109. A resistor 111 and capacitor 113 are connected in series with input 109 and primary winding of an isolation transformer 115 to provide a positive, current-limited, differentiated current pulse into the primary winding of transformer 115 at time t=0. This current pulse is transformed into the secondary of transformer 115 which has a diode 119 and a resistor 121 connected thereacross in parallel as shown. The secondary of transformer 115 provides waveform $v_3$ which is coupled to the base to emitter junction of an NPN bipolar transistor 130. The current flowing from the secondary of transformer 115 flows into the base of transistor 13 and is recirculated from the emitter of transistor 130 back into the secondary winding of transformer 115. Resistor 121 provides damping to help prevent oscillations or reversals in the voltage $v_3$ due to magnetic energy stored in transformer 115 and its distributed capacitance. Diode 119 provides a path for current flow at time $t_1$ when voltage $v_1$ drops back to zero. Only the positive-going portion of the $v_3$ waveform is used for triggering monostable multivibrator 101. Multivibrator 101 may be implemented using a type TLC 555CD integrated circuit timer 140. Timer 140 is configured as a one-shot by means of associated resistors 143 and 145 and a capacitor 150 connected in the conventional manner illustrated. Transformer 115 provides galvanic isolation between the source signal $v_1$ and the output signal $v_5$ to permit the output signal to be safely connected to the secondary control circuits of the D.C.-to-D.C. converter 15, 16.

At time t=0, transistor 130 conducts and pulls the voltage at the trigger input of timer 140 down to a voltage near control return. Resistor 143 provides a pull-up for the trigger input of timer 140 when transistor 130 is nonconducting. When the trigger input of timer 140 goes low at time t=0 the output pin of timer 140 goes high and capacitor 150 starts to charge positively through resistor 145. When the voltage at the threshold input of timer 140 reaches a predetermined value, the positive output pulse delivered is terminated and goes low. This occurs at $t_2$ whereupon capacitor 150 is discharged by an internal discharge circuit which forms a part of timer 140. The output of timer 140 is connected to supply through a rectifier 154 and a resistor 157. When the output of timer 140 is high, rectifier 154 is nonconducting and resistor 157 pulls $v_4$ high to a voltage at which it is clamped by a diode 161 and a stable reference voltage source 165 connected in series with diode 161. When the output of timer 140 is low, current through resistor 157 flows through rectifier 154 to pull $v_4$ low. Selecting a 2.5V voltage for reference voltage source 165 provides $v_4$ with a peak value, $V_m$, of approximately 2.8 volts and minimum of value $V_1$ of approximately 0.4 volts. Waveform $v_4$ is then filtered by a low pass filter comprised of resistors 160 and 162 and capacitors 169 and 171. Assuming K=1 in equation 9, $v_4$ is characterized by a pulse width $T_2$=1.5 microseconds $$v_5 = 0.4 + (3.6 \times 10^{-6}) f_1$$

For $f_1 = 0.3 \times 10^6$ Hz, $v_5 = 1.48$ volts and for $f_1 = 0$, $v_5 = 0.4$ volts.

Figure 9:
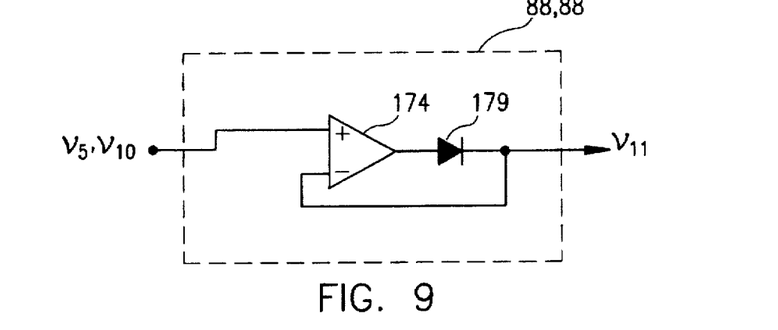
FIG. 9 is a schematic diagram illustrating a preferred bus driver of the type shown in FIG. 1.

FIG. 9, shows a preferred circuit implementation of the bus drivers 88 and 88'. Each includes a high input impedance operational amplifier 174 whose non-inverting input receives waveform $v_5$ or $v_{10}$ and whose output is connected to a rectifier 179. The cathode of rectifier 179 is fed back to the inverting input of amplifier 174. When the input voltage $v_5$ or $v_{10}$ is more positive than the voltage $v_{11}$ of bus 90, the circuit of FIG. 9 drives and sources current to bus 90. To minimize the error voltage $v_5$–$v_{11}$ or $v_{10}$–$v_{11}$, operational amplifier 174 acts to feed the output voltage $v_{11}$ on bus 90 back to the inverting input of amplifier 174. This provides a low output impedance and low error across bus driver 88, 88'. The low output impedance provided by amplifier 174 enables each driver 88, 88' to drive a large number of current share circuits that may be connected to the bus 90. When the voltage $v_{11}$ is higher than $v_5$ or $v_{10}$, the bus 90 of circuit 10 is being driven by another bus driver. Under those circumstances, it is important to have a high output impedance which is provided by rectifier 179 connected in series with the output of amplifier 174.

Figure 10:
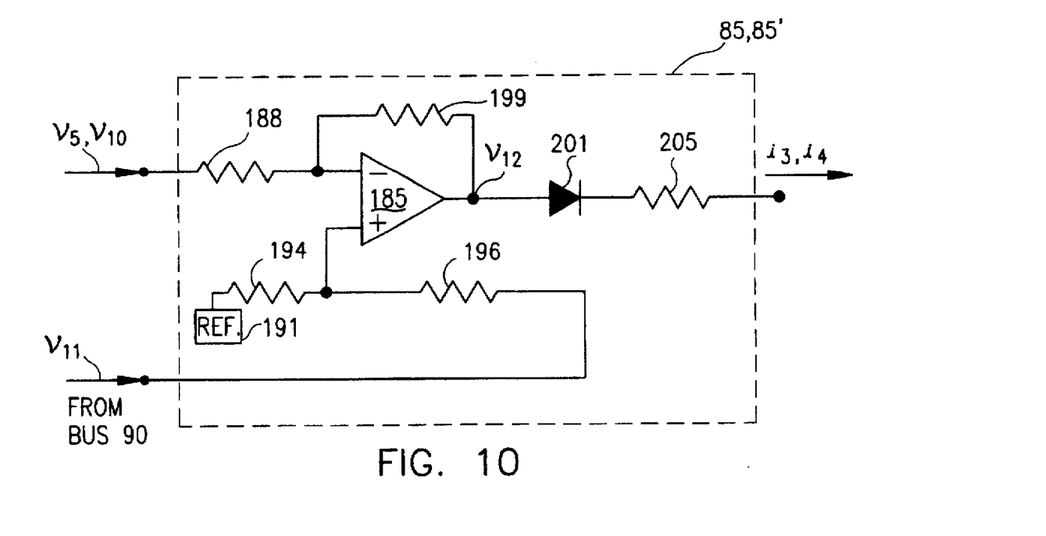
FIG. 10 is a schematic diagram illustrating a preferred amplifier circuit of the type shown in FIG. 1.

FIG. 10 shows a preferred implementation of each amplifier 85 and 85' shown in FIG. 1. An operational amplifier 185 has its inverting input coupled to $v_5$ or $v_{10}$ by way of a resistor 188. The non-inverting input of operational amplifier is coupled to bus 90 by way of the center of a voltage divider network tied to a voltage reference 191 and formed by resistors 194 and 196. The resistance of resistor 196 is selected to be equal to that of resistor 188. The output of amplifier 185 is coupled to its inverting input by way of a feedback resistor 199 whose resistance is selected to be equal to that of resistor 194. A rectifier 201 and a resistor 205 are connected in series with the output of operational amplifier 185 to form the output of each amplifier 85, 85'. Amplifiers 85 and 85' should exhibit high common mode rejection in order to prevent output signals from occurring when its associated bus driver 88 or 88' is driving bus 90. Under those conditions, the bus driver 88 or 88' is maintaining $v_5 = v_{11}$ or $v_{10} = v_{11}$ and it is important that $i_1 = 0$ or $i_2 = 0$. By selecting the resistance of resistor 188 equal to that of resistor 196 and selecting the resistance of resistor 199 equal to that of resistor 194 the output of amplifier 185 will provide a voltage $v_{12}$ equal to that of reference source 191 independent of the magnitude of the voltage $v_{11}$ on bus 90. The voltage of reference source 191 is selected to be less than that of reference 69 shown in FIG. 2 where rectifier 201 is non-conducting. When being driven by bus 90 under conditions where $v_{11} > v_5$ or $v_{11} > v_{10}$, the error signal represented by the difference between those two voltages is amplified to increase the output voltage of $v_{12}$ of operational amplifier 185 to a voltage exceeding that of the reference 69 of FIG. 2. This causes current $i_3$ or $i_4$ to flow in rectifier 201 and resistor 205. Consequently, the output current of the D.C.-to-D.C. converter 15 or 16 to which the respective amplifier 85 or 85' is coupled increases and causes $v_5$ or $v_{10}$ to increase and track the voltage $v_{11}$ on bus 90. Reference source 191 is selected to set $v_{12}$ as close as possible to the voltage of reference 69 to minimize the magnitude of the error signal required to start conduction of rectifier 201. Although this error signal will result in an error in sharing it will be minimal provided the gain of amplifier 85, 85' is high. The gain of amplifier 85, 85' is determined by the ratios of resistor 199 to resistor 188 and resistor 194 to resistor 196.

A listing of the parts included in the circuit 10 of the preferred embodiment is set forth below in Table 1.

TABLE 1

| D.C.-to-D.C. converters 15, 16 | VICOR Corp. VI-200 or VI-J00 series |
| --- | --- |
| Resistor 111 | 1.2 Kilohm |
| Capacitor 113 | 150 Picofarad |
| Transformer 115 | Ferrite Core, 6T:6T |
| Diodes 119, 154, 161, 179, 201 | BAT 74 |

TABLE 1-continued

| D.C.-to-D.C. converters 15, 16 | VICOR Corp. VI-200 or VI-J00 series |
|---|---|
| Resistor 121 | 316 Ohm |
| Transistor 130 | MMBT 2369 |
| Capacitor 150 | 150 Picofarad |
| Resistor 143 | 4.53 Kilohm |
| Resistor 145 | 6.19 Kilohm |
| Timer 140 | TLC555CD |
| Resistor 157 | 4.53 Kilohm |
| Reference 165 | TL431ACD |
| Resistor 160 | 10 Kilohm |
| Resistant 162 | 681 Ohm |
| Capacitor 169 | 10 Microfarad |
| Capacitor 171 | 0.01 Microfarad |
| Operational amplifiers 174, 185 | LM358D |
| Resistors 188, 196 | 31.6 Kilohm |
| Resistors 199, 194 | 316 Kilohm |
| Resistor 205 | 147 Kilohm |

While the structure and operation of a preferred embodiment of the invention has been described, those skilled in the art will recognize in light of the present disclosure that various structural and operational changes can be made without departing from the scope of the invention as particularly pointed out and distinctly claimed in the appended claims including their legal equivalents. For example, it will be readily recognized that while the preferred embodiment takes the form of an analog circuit, the apparatus and method can be implemented digitally in forms utilizing a microprocessor or digital components, in discrete or integrated circuit form.

What is claimed is:

1. An apparatus for sharing a load current substantially equally among D.C.-to-D.C. converters having outputs coupled mutually in parallel to a common load, said apparatus comprising:
   (a) at least two D.C.-to-D.C. converters of a type whose output varies according to a controllable operating frequency, each of said converters including
      (i) at least one D.C. input coupleable to a D.C. source;
      (ii) at least one D.C. output coupleable to the load;
      (iii) an output terminal providing an indicating signal representing said operating frequency, and
      (iv) an input terminal for receiving a control signal for adjusting said operating frequency, and
   (b) circuit means coupled to each said output terminal and to each said input terminal for receiving said indicating signal from each said converter, for determining based on said indicating signals which one of said converters is supplying the largest share of said load current and for applying to said input terminal of each of said converters other than said one of said converters a respective control signal tending to equalize sharing of said load current among said converters.

2. The apparatus of claim 1 wherein said circuit means comprises means for generating each respective said control signal based on the difference between the values of a parameter of a first signal representing said operating frequency of said one of said converters and a second signal representing said operating frequency of another of said converters.

3. A method for sharing a load current substantially equally among at least two D.C.-to-D.C. converters coupled to a common load, said method comprising the steps of:
   (a) generating at least two indicating signals, individual ones of said indicating signals having a frequency characteristic which bears a predetermined relationship to the amount of current being supplied to the load by each respective one of said converters;
   (b) determining based on said indicating signals and said predetermined relationship which one of said converters is supplying the largest share of said load current; and
   (c) adjusting the output current supplied by each of said converters, other than said one of said converters, in accordance with a respective control signal generated based on said indicating signals.

* * * * *